US006520676B1

(12) United States Patent
Schmitz

(10) Patent No.: US 6,520,676 B1
(45) Date of Patent: Feb. 18, 2003

(54) SENSOR HOLDER FOR DENTAL DIGITIZED RADIOGRAPHY PROCEDURE

(76) Inventor: William B. Schmitz, 1001 E. Morton Pl., Suite B, Hemet, CA (US) 92543

( * ) Notice: Subject to any disclaimer, the term of this patent is extended or adjusted under 35 U.S.C. 154(b) by 0 days.

(21) Appl. No.: 09/706,106

(22) Filed: Nov. 3, 2000

(51) Int. Cl.$^7$ .................................................. G21K 4/00
(52) U.S. Cl. ...................................... 378/191; 378/168
(58) Field of Search ................................ 378/167–170, 378/191

(56) References Cited

U.S. PATENT DOCUMENTS

| 4,075,494 A | * | 2/1978 | Jermyn | 378/170 |
| 4,489,427 A | * | 12/1984 | Allison | 378/168 |
| 4,916,724 A | * | 4/1990 | Kilber | 378/167 |

* cited by examiner

*Primary Examiner*—Craig E. Church

(57) ABSTRACT

A holder for a sensor used in dental radiography is provided having an ultra-thin bite wing and a reinforced juncture between the bite wing and the integral sleeve such that a perpendicular orientation is maintained while the sensor is in the patient's mouth. The dimensions of the present invention allow the patient's teeth to be in close proximity while an image is formed using the sensor, and the disposable sensor provides a mechanism for indicating a previous use to ensure single use. The holder is formed using an injection molding process of polyethylene of 40 to 80 melt flow, with a preferred melt flow of 60. The thin bite wing is enabled because of a reinforced T-joint at the base of the sleeve along the spine connecting the bite wing, which maintains the sleeve and the holder in a perpendicular orientation with respect to the plane formed by the upper and lower surfaces of the mating teeth.

3 Claims, 1 Drawing Sheet

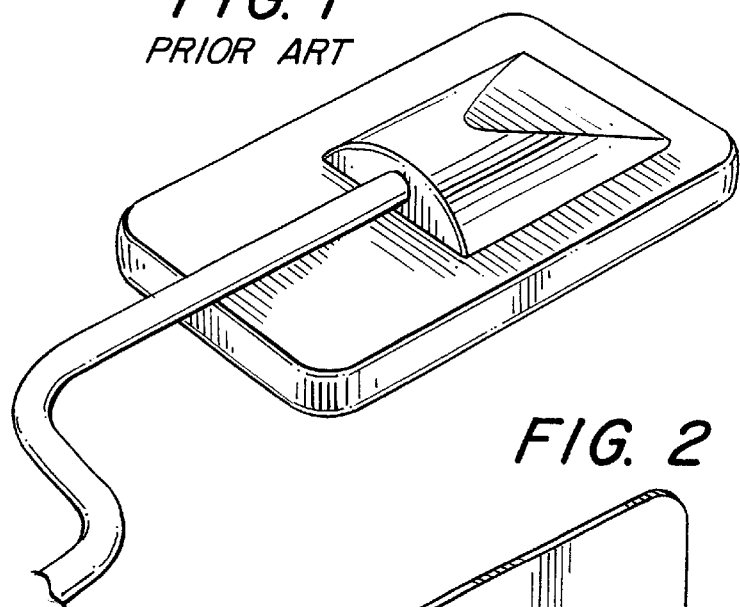
FIG. 1
PRIOR ART
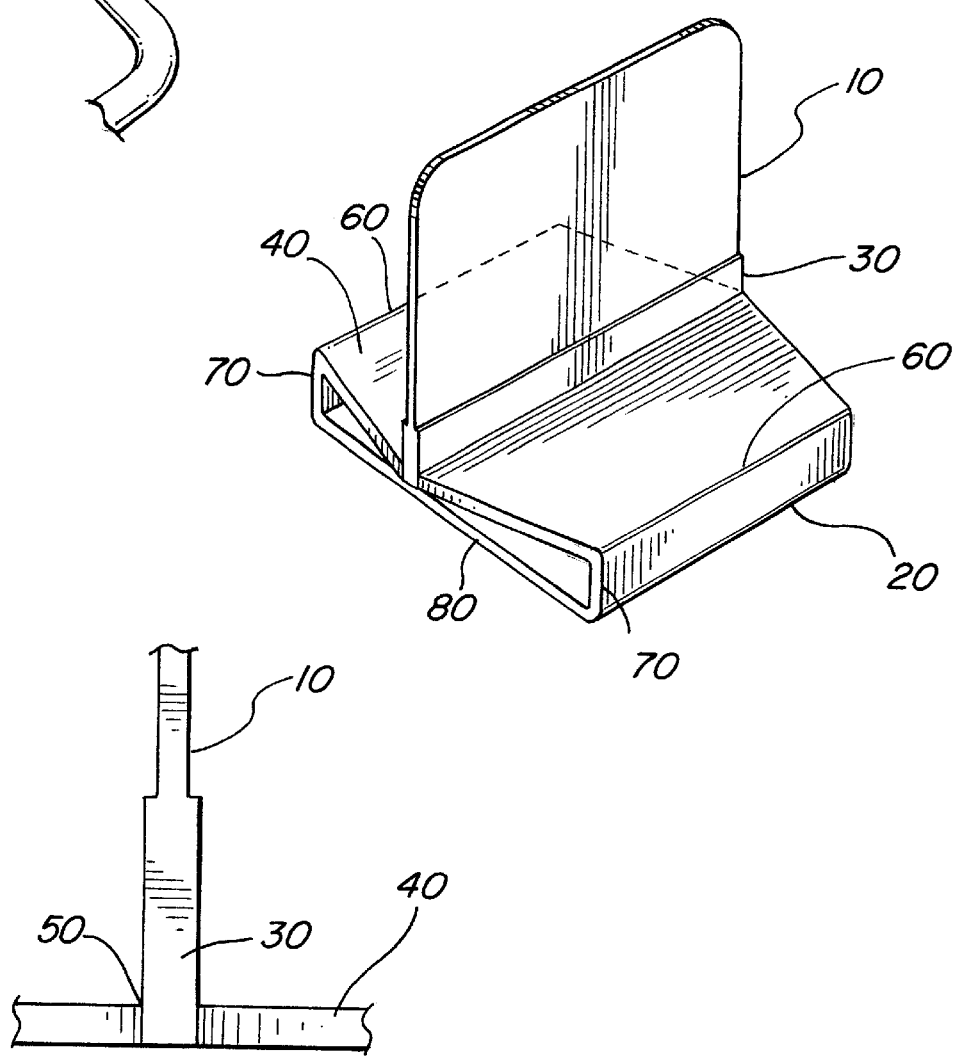
FIG. 2
FIG. 3

SENSOR HOLDER FOR DENTAL DIGITIZED RADIOGRAPHY PROCEDURE

BACKGROUND OF THE INVENTION

1. Field of the Invention

The present invention relates generally to dental applications, and more particularly to a holder for a digitized radiograph procedure to position and protect the sensor.

2. Description of Related Art

Digitized dental radiography is a relatively new procedure for examining a patient's teeth using significantly less radiation than dental x-rays traditionally used to examine teeth. The procedure uses a sensor that is placed in the patient's mouth, and a source of gamma radiation is directed to the sensor. The sensor comprises pixels in an array which are influenced by the gamma radiation passing through the patient's teeth, and the pixels form an image which can be transmitted to a monitor for real time viewing. One benefit of the procedure is that the amount of radiation needed to activate the sensor is far less than the amount of radiation that the patient is exposed to during the x-ray procedure. Another benefit is the evaluation of real time images allowing the dentist to reposition the sensor or acquire more images if needed without the delay associated with allowing x-ray images to develop. The images have a higher resolution than x-rays and can be manipulated using software to zoom and contrast, making diagnostics more precise.

FIG. 1 shows a sensor that is typical of those used in dental radiography. The sensors come in various sizes to accommodate different patients, and the sensor is connected to a cable that includes at one end a port used to connect to a computer. When the sensor is exposed to gamma radiation, the pixels on the sensor form an image that is transferred to the computer for image processing. Software converts the signal to an image displayed on a monitor for viewing by the dentist. One difficulty, however, lies in the positioning of the sensor inside the patient's mouth. The sensor must be positioned perpendicular to the radiation source, and the positioning of the sensor must be such that the patient does not suffer discomfort while the procedure is taking place. Current methodology is to connect the sensor to a rod that extends through the patient's mouth and includes a target aligned with the sensor for positioning the sensor. The apparatus is unwieldy and uncomfortable, and requires sanitation after each use. A better solution is needed for positioning the sensor.

SUMMARY OF THE INVENTION

The present invention attempts to overcome the shortcomings of the prior art by providing a sensor holder that accurately positions the sensor in the patient's mouth in a comfortable and safe manner. The present invention comprises a disposable combination of a sleeve or pocket for the sensor made from a soft material such as polyethylene or polystyrene, in conjunction with a bite wing rigidly formed with the sleeve. The holder is placed between the patient's teeth, and the more rigid juncture between the sleeve and the bite wing ensures that the sensor will be accurately positioned. The thickness of the bite wing is designed to maintain an acceptable spacing between the patient's upper teeth and the lower teeth. In a preferred embodiment, the holders of the present invention are disposable and thus obviate the need for sterilization, and may include an indicator to notify the operator that the holder has previously been used. The holder may include color codings for different regions of the mouth and the holder may be impregnated with a flavoring for the patient's enjoyment. The sleeve or pocket has the added benefit of protecting the sensor (which is both expensive and very fragile) from accidental damage due to contact with the sensor.

BRIEF DESCRIPTION OF THE DRAWINGS

The exact nature of this invention, as well as its objects and advantages, will become readily apparent upon reference to the following detailed description when considered in conjunction with the accompanying drawings, in which like reference numerals designate like parts throughout the figures thereof, and wherein:

FIG. 1 is an illustration of the sensor used in a radiography procedure;

FIG. 2 is a perspective view of a preferred embodiment of the present invention; and FIG. 3 is a close-up view of the juncture between the sleeve and the bite wing.

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide a sensor holder for a dental radiography procedure.

To position and protect a sensor in the mouth of a patient, the present invention provides a holder that comprises an integrally formed bite wing 10 and a sleeve 20. FIG. 2 illustrates the holder in perspective view. The relationship between the bite wing 10 and the sleeve 20 is maintained by a reinforced T-joint 30 at the juncture of the two elements. Thus, the sleeve 20 is held perpendicular to the bite wing 10 by the T-joint 30. The reinforced T-joint 30 ensures that, when the patient bites down on the bite wing 10, the sleeve 20 and sensor within the sleeve 20 will remain rigidly positioned perpendicular to the plane defined between the upper and lower teeth. The T-joint 30 is reinforced because the bite wing 10 needs to be very thin in order for the upper teeth to be in proximity with the lower teeth after the upper and lower teeth bite into the bite wing 10. The larger the gap between the teeth, the more the distortion in the image and the poorer the quality of the image. To maintain adequate spacing, the thickness of the bite wing 10 away from the T-joint 30 is preferably twenty thousands of an inch or less. The sleeve 20 is preferably of a thickness of twenty thousands of an inch or less also, except in the base 40 where the bite wing 10 connects to the sleeve 20. The base of the sleeve 20 is preferably reinforced to a thickness of approximately twice that of the bite wing 10.

The sleeve 20 has a rectangular profile which houses the sensor, and a base 40 which enlarges along a spine 50 that forms the juncture with the bite wing 10. The extreme edges 60 of the base 40 narrow and the other three sides of the sleeve 20 are preferably of a width equal to the width of the extreme ends 60 of the base 40. Since the base of the just described sleeve overlaps the opposite face of the sleeve, the sensor is not completely held with the sleeve 20 and thus can be removed easier. In a preferred embodiment, the sides 70 of the sleeve 20 are thicker than the face 80 of the sleeve 20 opposite the base 40 to form a more rigid holder.

FIG. 3 illustrates an enlarged view of the juncture between the sleeve 20 and the bite wing 10. The T-joint 30 shows a thicker portion of the bite wing 10 adjacent the sleeve 20 to increase the rigidity of the joint. The base 40 of the sleeve, i.e. the portion of the sleeve which connects the bite wing, is also thicker than the bite wing region where the patient bites the holder, to form a sturdy positioning for the sensor. During the procedure, the sensor is placed in the sleeve sized specifically to firmly hold the sensor therein, and the holder with the sensor is placed in the patient's mouth. The patient bites down fairly hard on the bite wing, cinching the sleeve tight against the adjacent upper and lower teeth. The reinforced T-joint 30 ensures that the sensor is perpendicular to the plane defined by the surfaces of the mating upper and lower teeth, and the image of the teeth is formed by an exposure of gamma radiation. The sensor provided a signal to a connected computer that receives the signal and forms an image on a monitor of the teeth. The image can be printed, saved to a file, manipulated or otherwise used for diagnostics of the teeth.

In order to obtain the thickness of the bite wing and sleeve while maintaining the properties of the invention, several types of materials were investigated. The holder needs to have some pliability, but also must be rigid enough to position and protect the sensor. Another aspect of the material is that the holder preferably be indented with teeth marks after being used, to preclude reuse of the holders. This is a hygiene feature of the present invention that is derived from an appropriate choice of materials. After some experimentation, the preferred material is a polyethylene plastic that is injection molded to form the present invention. The melt flow of the polyethylene is between 40 and 80, with a preferred melt flow of 60. Another alternative is using a foam polystyrene similar to that used for packing material, because the foam can be compressed between the teeth to a small thickness and the biting will leave an obvious mark in the bite wing precluding subsequent use.

The holder of the present invention can be color coded for different regions of the mouth. For example, one color can indicate a holder suited for molars while a second color could indicate a holder for bicuspids. Ease of use is paramount in the dental industry, and color codings can make a procedure a simpler routine to practice. The holders of the present invention can also include a flavor such as mint or cherry to enhance the experience for the patient. By making the holder of a plastic such as 40–80 melt polyethylene, the operator guarantees that the holders will be single use only since the patient will leave a bite mark in the bite wing. By making the holders single use, and thus disposable, the present invention provides security to the patient that cannot be compromised by absent minded or unscrupulous operators.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A holder for a dental sensor formed from polyethylene having a melt flow between 40 and 80 comprising:
   a sleeve having a base, first and second sides, and an opposing face; and,
   a bite wing integrally formed with the sleeve along a spine on the base, the bite wing and the sleeve joined at the spine by a portion of the bite wing having an increased thickness with respect to a portion of the bite wing designated for being bitten by a patient.

2. The holder of claim 1 wherein the polyethylene has a melt flow of 60.

3. A holder for a dental sensor comprising:
   a sleeve having a base, first and second sides, and an opposing face;
   a bite wing integrally formed with the sleeve along a spine on the base, the bite wing and the sleeve joined perpendicularly at the spine by a portion of the bite wing having an increased thickness with respect to a portion of the bite wing designated for being bitten by a patient; and,
   a mechanism for establishing a single use comprising a selection of materials such that a use of the holder will leave bite marks on the bite wing of the holder.

* * * * *